Oct. 8, 1935.  H. E. BRELSFORD ET AL  2,016,481

BOILER GAUGE GLASS

Filed Jan. 22, 1931

INVENTORS
Harry E. Brelsford
Norman L. Snow
BY
ATTORNEYS

Patented Oct. 8, 1935

2,016,481

UNITED STATES PATENT OFFICE 2,016,481

BOILER GAUGE GLASS

Harry E. Brelsford, Detroit, Mich., and Norman L. Snow, New Canaan, Conn., assignors to Diamond Power Specialty Corporation, Detroit, Mich., a corporation of Michigan Application January 22, 1931, Serial No. 510,538

2 Claims. (Cl. 73—54)

This invention relates to gauges and has particular reference to a gauge of the character used in indicating the level of a fluid.

The invention will find particular utility in a gauge construction wherein the temperature of the fluid or liquid being measured varies considerably from the temperature of the environment of the gauge in that the invention contemplates the provision of means for eliminating strains and the like incident to expansion and contraction of a gauge.

One of the primary objects of this invention is to provide a gauge of the above mentioned character which will include a metallic body portion and a glass window portion and to associate with this gauge, means for eliminating all straining of the glass window portion of the gauge incident to expansion and contraction of the metallic body portion thereof.

Other objects and advantages of this invention will become more apparent as the following description proceeds, particularly when reference is had to the accompanying drawing wherein.

Figure 1:
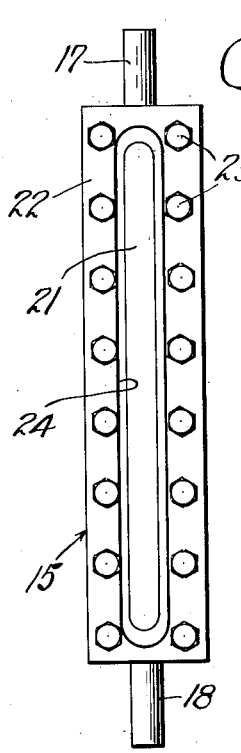
Figure 1 is a front elevational view of a gauge body constructed in accordance with the teachings of this invention.
Figure 2:
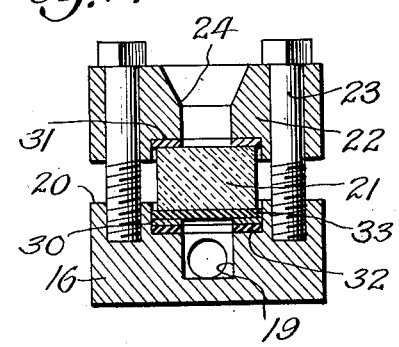
Figure 2 is a horizontal sectional view through the gauge shown in Fig. 1.

Referring then particularly to the drawing wherein like reference characters designate corresponding parts throughout the several views, there is shown in Figures 1 and 2 a gauge designated generally by the reference character 15. This gauge includes a gauge body 16 terminating at its upper and lower ends in tubular extensions 17 and 18 adapted for connection to gauge fittings (not shown), in accordance with the usual practice. For the purpose of description and illustration, it will be assumed that the tubular extensions 17 and 18 are connected to a boiler drum or the like whereby the gauge measures the level of the water in the boiler drum although it is to be clearly understood that the inventive features will be equally applicable to any construction wherein the temperature of the fluid or liquid being measured varies considerably from the temperature of the environment of the gauge construction. Thus the gauge construction may be utilized for measuring extremely hot liquids or fluids or for measuring extremely cold liquids or fluids since in either case the temperature of the gauge construction would normally vary considerably from the temperature of its environment.

The gauge body is provided with the longitudinally extending bore 19 which, in the form of invention illustrated, opens through the front 20 of the gauge body and which is connected at its ends to the tubular extensions 17 and 18 for receiving steam or water from the same. For closing the front of the channel 19 there is provided a gauge glass 21 which is held in place by a suitable cover 22 which is fixed to the gauge body by studs, or the like, 23. It will be understood that the gauge cover is provided with the sight opening 24 through which the level of the liquid in the channel 19 may be observed.

In a construction of this character it is necessary that the gauge glass have a tight fit with the portion of the gauge body surrounding the front of the channel 19 to prevent the leaking of water or steam from this channel. It is thus customary to provide gaskets between the face of the glass and the body of the gauge, and since these gaskets adhere more or less or have heavy friction with the glass and the body of the gauge, the greater rate of expansion of the body of the gauge relative to the glass causes a strain on the glass which tends to break the same. This is particularly true where the gauge body is made of steel, as is usually the case, since steel has ordinarily approximately twice the coefficient of expansion of glass.

To eliminate this strain, the present invention contemplates the provision of compensating strips 30 and 31. These strips are of metal of high tensile strength and a metal is selected, the coefficient of expansion of which is substantially the same as that of glass. The strip 30 is preferably placed between the gauge glass 21 and a gasket 32 which engages the gauge body, while the compensating strip 31 may be placed directly between the glass 21 and the cover 22. If desired, a mica strip 33 may be positioned between the strips 30 and the gauge glass 21. With the compensating strips in position, there will be no slipping between the compensating strips and the glass, all slipping being confined to the faces of the compensating strips adjacent to the body of the gauge. Thus, the glass would be entirely protected against all strain incident to expansion and contraction of the gauge body during use thereof.

Figure 3:
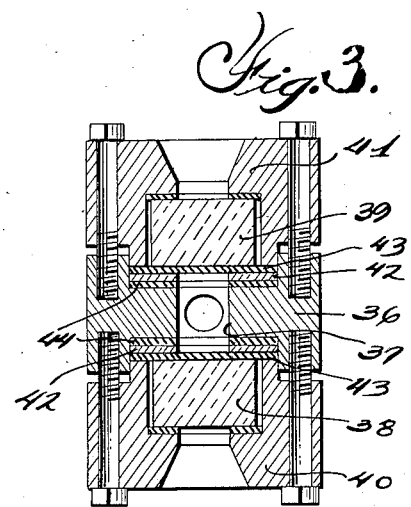
Figure 3 is a view similar to Figure 2 showing a modified form of construction.

In Figure 3 a structure similar to that shown in Figure 2 is disclosed with the exception that in this form of construction the level of the water is visible from either side of the gauge body. Referring then particularly to this figure of the drawing, there is shown a gauge body 36 provided with the longitudinally extending recess 37 which opens through both the front and rear faces of the gauge body. Gauge glasses 38 and 39 are provided for closing the opposite sides of the recess 37, these gauge glasses being held in place by cover members 40 and 41 respectively.

To prevent the imposing of strains on the glasses 38 and 39 upon expansion and contraction of the gauge body, compensating strips 42 are provided. These strips are located preferably between mica strips 43 which are arranged in juxtaposition to the glasses, and gaskets 44 which are arranged in juxtaposition to the gauge body. Thus, the gaskets prevent leakage of steam and water past the glasses, while the compensating strips prevent direct contact between the glasses and the gauge body.

It might be noted that in both embodiments of the invention, it is immaterial whether each compensating strip is formed in one or several sections. Thus the compensating means may be a single piece of metal or the like having a sight opening, or the compensating means may be formed of several strips placed on opposite sides of the gauge sight opening. The term "compensating strip or strips" should therefore be construed in all cases as meaning a compensating means formed in one or several pieces.

As brought out before, it is to be understood that while the invention has been described in connection with a gauge for indicating the level of water in a boiler drum or the like, the invention will find equal utility in a gauge of any character wherein the temperature of the fluid being measured varies considerably from the temperature of the environment of the gauge. Thus, the invention will find utility wherever the gauge is subject to expansion or contraction during use thereof.

In practicing the invention, the metals or alloys used for the compensating strips or the like may be varied to provide the desired results. Thus, for example, iron alloys containing 42% nickel, 46% nickel, or 48% nickel might be utilized, these alloys having coefficients of expansion less than glass, equal to glass and greater than glass, respectively. If it is desired to use other alloys, one alloy known to the trade as "Konel", may be used, this alloy having the following composition:

| | |
|---|---|
| Nickel | 73.0 |
| Cobalt | 17.5 |
| Iron | 6.5 |
| Titanium | 2.5 |
| Manganese | .2 |

While this is a nickel alloy, it is more commonly considered as a cobalt alloy. As a further example, an alloy known to the trade as "stainless iron" may be used, this alloy having a composition of:

| | |
|---|---|
| Iron | 82—83 |
| Chromium | 16—17 |
| Manganese | .4 |
| Carbon | .1 maximum |

Thus numerous different metals and alloys may be utilized, depending upon the results desired in the complete device, that is, whether or not it is desired that the compensating strips have the same coefficient of expansion as glass or a greater or less coefficient of expansion than glass.

While the invention has been described with some detail, it is to be understood that the description is for the purposes of illustration only and that the right is reserved to make such changes in the details of construction and arrangement of parts as will fall within the purview of the attached claims.

What we claim as our invention is:

1. In a gauge of the class described, a gauge body having a steam and water receiving recess, a glass for closing said recess, and metallic strips of high tensile strength and of substantially the same coefficient of expansion as glass positioned between the face of said glass and the gauge body for preventing straining of said glass upon expansion or contraction of said gauge body to a greater degree than said glass.

2. In a gauge of the class described, a gauge body having a steam and water receiving recess, a glass for closing one side of said recess, a cover for holding said glass in position, and compensating strips of high tensile strength and having substantially the same coefficient of expansion as glass positioned between the gauge body and said glass and between said glass and said cover.

HARRY E. BRELSFORD.
NORMAN L. SNOW.